US009279658B1

(12) United States Patent
Maffett et al.

(10) Patent No.: US 9,279,658 B1
(45) Date of Patent: Mar. 8, 2016

(54) SYSTEM AND METHOD FOR SETTING UP SECONDARY REFLECTIVE OPTIC

(71) Applicant: Exelis Inc., McLean, VA (US)

(72) Inventors: Steven Paul Maffett, Spencerport, NY (US); Andrew VanAuken, Dansville, NY (US); Cormic Merle, Rochester, NY (US)

(73) Assignee: Exelis, Inc., Herndon, VA (US)

( * ) Notice: Subject to any disclaimer, the term of this patent is extended or adjusted under 35 U.S.C. 154(b) by 151 days.

(21) Appl. No.: 13/803,313

(22) Filed: Mar. 14, 2013

(51) Int. Cl.
*G01B 11/00* (2006.01)
*G01B 9/02* (2006.01)
*G02B 21/26* (2006.01)
*G02B 7/00* (2006.01)

(52) U.S. Cl.
CPC ........ *G01B 9/02049* (2013.01); *G01B 9/02061* (2013.01); *G02B 7/00* (2013.01); *G02B 21/26* (2013.01)

(58) Field of Classification Search
CPC ........... G01B 9/02038; G01B 9/02051; G01B 9/02056; G01B 9/02061; G01B 9/02015; G01B 9/02049; G02B 7/00; G02B 21/26; G01M 1/04; G01J 3/0202
USPC ................... 359/871–877, 857–858
See application file for complete search history.

(56) References Cited

U.S. PATENT DOCUMENTS

| 2,641,958 | A | * | 6/1953 | Zobel et al. ................ 356/515 |
| 3,674,334 | A | * | 7/1972 | Offner .......................... 359/366 |
| 4,420,836 | A | * | 12/1983 | Harper ............................. 372/98 |
| 4,691,999 | A | | 9/1987 | Wheeler |
| 5,689,339 | A | * | 11/1997 | Ota et al. ....................... 356/401 |
| 5,822,066 | A | * | 10/1998 | Jeong et al. .................... 356/521 |
| 6,163,417 | A | * | 12/2000 | Nunnally .............. G02B 7/004 359/811 |
| 2002/0176092 | A1 | * | 11/2002 | Deck ............................ 356/515 |
| 2005/0225770 | A1 | * | 10/2005 | Chapman et al. ............. 356/498 |
| 2006/0215166 | A1 | * | 9/2006 | Tsao ............................. 356/452 |
| 2009/0257118 | A1 | * | 10/2009 | Heritier et al. ................ 359/399 |
| 2009/0295878 | A1 | * | 12/2009 | Hanchak .................... B41J 2/02 347/74 |
| 2009/0303490 | A1 | * | 12/2009 | Asano et al. .................. 356/450 |
| 2010/0122602 | A1 | * | 5/2010 | Marcroft et al. ........... 74/490.03 |
| 2011/0109946 | A1 | * | 5/2011 | Osipchuk ................ F16F 7/104 358/474 |
| 2012/0154819 | A1 | | 6/2012 | Cobb et al. |

OTHER PUBLICATIONS

Newport Corporation, Specification Data Sheet for HXP100, "HEXAPOD"; www.newport.com; May 2012.

* cited by examiner

*Primary Examiner* — Michael A Lyons
*Assistant Examiner* — Maurice Smith
(74) *Attorney, Agent, or Firm* — RatnerPrestia

(57) ABSTRACT

An apparatus for testing an optical test piece comprising an interferometer for emitting an incident light beam. The apparatus includes a first reflective optic that receives the incident beam and produces a first reflected beam by focusing and expanding the received incident beam. The apparatus also includes a second reflective optic that receives and collimates the first reflected beam and outputs the collimated beam toward the optical test piece. Both the first and the second reflective optics are fixed to their respective positions relative to a thermally insensitive platform and the optical test piece is docked to the thermally insensitive platform and can be removed.

15 Claims, 6 Drawing Sheets

SYSTEM AND METHOD FOR SETTING UP SECONDARY REFLECTIVE OPTIC

BACKGROUND

Interferometry techniques are used for testing surfaces of optical elements. In one interferometry test configuration, known as a Fizeau interferometer, a plane parallel wavefront is used to test flat optics. There are several such devices available from manufacturers and most commonly have a 4 inch diameter aperture. When a measurement is required on a larger flat, it is often accomplished by coupling one of these common 4 inch Fizeau interferometers to a beam expander.

Commercially available beam expanders are typically made from large refractive elements. One of the purposes of using refractive optics in interferometry techniques is to guide light through the interferometer system. However, refractive optical elements tend to produce beam scattering which degrades the quality of the interferometer output measurements. Moreover, functionalities of refractive optics are dependent on the wavelength of operation. As such, the interferometer system needs to be adjusted for a specific wavelength every time the operational wavelength is changed.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. The letter "n" may represent a non-specific number of elements. Also, lines without arrows connecting components may represent a bi-directional exchange between these components. According to common practice, the various features of the drawings are not drawn to the scale. Also, the dimensions of the various features are arbitrarily expanded or reduced for clarity. Included in the drawings are the following figures.

DETAILED DESCRIPTION

In recent times interferometer systems have been employed for testing optical surfaces. However, testing of optical surfaces with large dimensions has been a challenge. One way to overcome such a challenge is to include a device, such as a beam expander, in the interferometer system which can expand a narrow incident beam emanating from a light source to a wide beam in order to match the large dimensions of the optics under test. Typically these devices use large refractive optics which facilitate enlarging the beam. For example, in a Fizeau Interferometer including a beam expander with refractive optics may be used to expand a beam from 4" to 12"-32". Moreover, the refractive optic components in the beam expander typically have mechanically adjustable features to enable alignment of the system.

However, refractive optics are inherently dispersive. That is, their optical responses change with respect to wavelengths. As such, the operation of these large beam expanders is limited to a specific wavelength for a given alignment resulting in additional and frequent alignments for different wavelengths of operation. Large refractive optics also often have issues with polarization-dependence and birefringence, which can cause problems in the interferometric measurements. Additional problems may arise with drift in alignments, for example, when large test optics with different weights are introduced on a test bed in the interferometer system. Drifts in alignments also occur when the adjustable mounts for the refractive optics, required for adjusting the system alignment for different wavelengths, are thermally sensitive and tend to drift in position over time due to temperature variations. Moreover, typically each of the refractive optical components has its own adjustable mount leading to an increase of the overall cost of the system.

The present invention overcomes the issue of wavelength sensitivity and polarization sensitivity by replacing refractive optics with reflective optics in the beam expander of the interferometer system. The present technology also addresses the alignment issues described above by using a beam expander on a thermally insensitive platform. The platform interfaces kinematically with the test bed on which the interferometer system resides mitigating issues with weight variations of the optical test piece. Lastly, concerns related to cost and drifts with adjustment stages are addressed by eliminating adjustments in the final interferometer setup.

Thus, the present invention lends itself to instantaneous and highly precise interferometry by including reflective optics and optical mounts with novel features.

Figure 1:
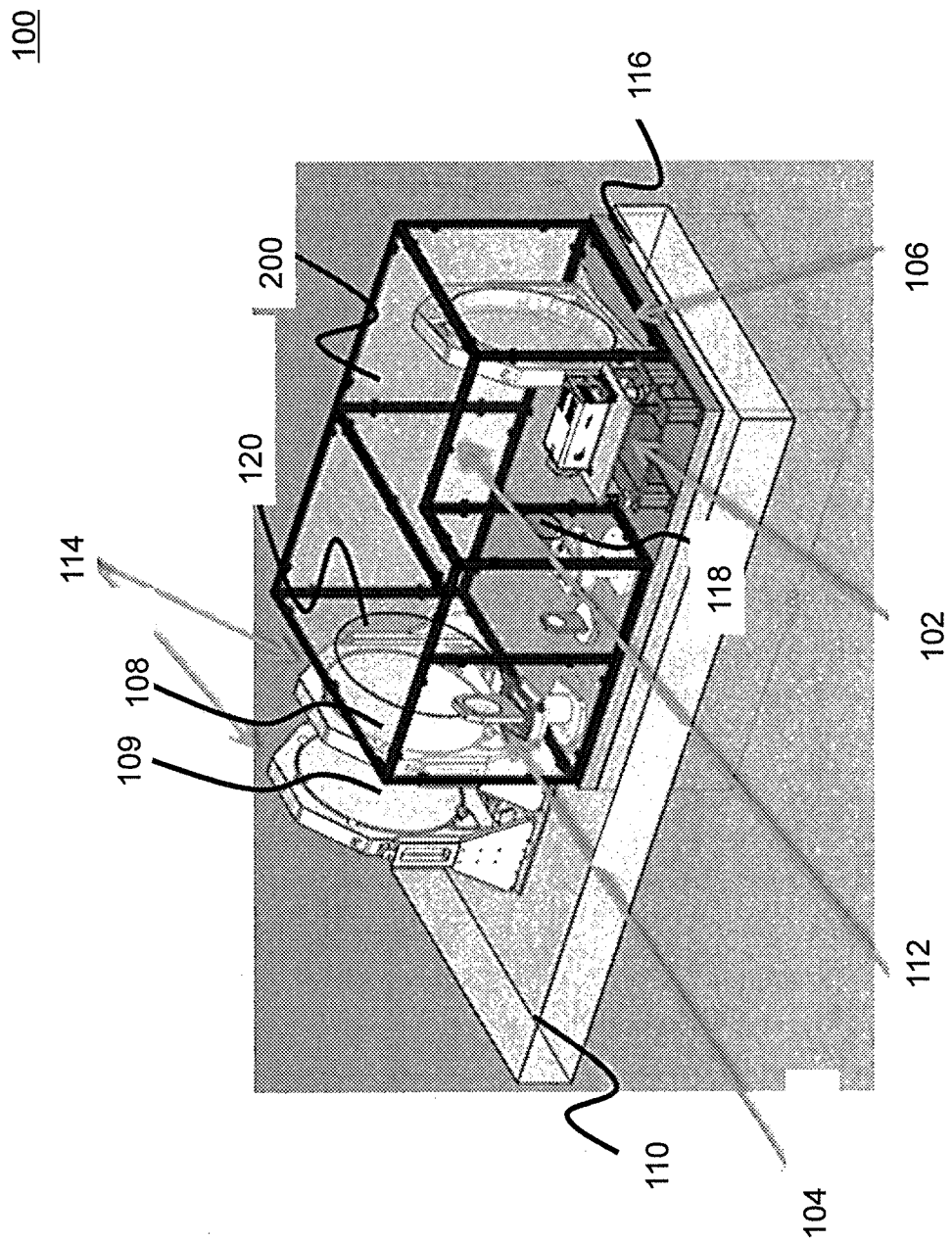
FIG. 1 is a perspective diagram illustrating an embodiment of the present invention showing a test setup for wavefront measurements.

FIG. 1 provides a view of an embodiment of the invention illustrating an interferometer test setup 100. The setup 100 includes an interferometer 102, a secondary mirror 104, a primary mirror 106; and a reference flat 109 and a transmission flat 108 mounted on tip/tilt stages 114. The secondary mirror 104 and the primary mirror are inside an enclosure 112, whereas, the interferometer 102, and the reference and transmission flats and the tip/tilt stages 114 are outside the enclosure 112. The interferometer 102, the secondary mirror 104, the primary mirror 106 and the enclosure 112 sit on a beam expander mount platform 116. The secondary mirror 104 and the primary mirror 106 constitute a beam expander 200. All the optical components, stages, platforms both inside and outside the enclosure 112 reside on a test bed 110.

The interferometer 102, at the input of the beam expander may be a Fizeau interferometer, for example. The interferometer 102 may be other interferometers (but not limited to), such as Twyman-Green interferometer, or Shack-Hartman wavefront sensor, for example. In the discussion that follows, implementation of a Fizeau interferometer will be considered but the same principles apply to the implementations of the other interferometers mentioned above. During a test operation, the interferometer 102 in conjunction with the beam expander 200 using the test setup 100 collect results of large aperture optics. The beam expander 200 receives a narrow incident beam from the interferometer 102 through a cut-out window 118 in the enclosure 112. The incident beam interacts with the reflective optics (secondary mirror 104 and the primary mirror 106) of the beam expander 200 and expands before it exits through another cut-out window 120 to reach the reflecting reference and test pieces such as the reference/transmission flats 108 along a path. The enclosure 112 may provide thermal isolation for the beam expander 200 from a variation in the atmospheric temperature. This enclosure also limits air turbulence within the path of the beam expander. Reflected beams coming back from the reference/transmission flats 108 along the same path are then processed by the interferometer 102.

Briefly, in a Fizeau interferometry technique, light reflected from two reflecting surfaces combines constructively and destructively to form interference fringes. One of the reflecting surfaces is a reference surface whereas the other one is a test surface (e.g., see reference and transmission flats 109 and 108 in FIG. 1). The fringes produced from the reflected light may be used to measure the surface profile of the optical test piece. An incident beam directed towards the reflecting surfaces may be expanded through a beam expander in order to match the dimensions of the optical test surface (e.g. see interferometer 102 and beam expander 200 in FIG. 1). Details of an exemplary beam expander 200 are given below.

Figure 2:
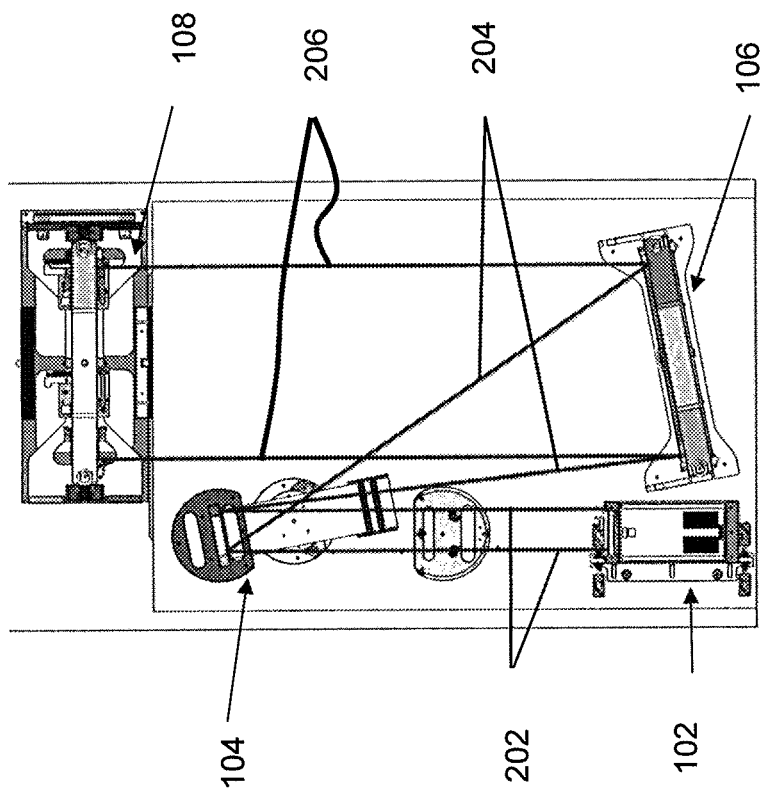
FIG. 2 is a top-plan view showing a beam expander in accordance with an embodiment of the present invention.

As detailed above, one of the major concerns of a beam expander using refractive optics is that it tends to have inherent problems such as birefringence. To overcome such issues, the present invention implements a beam expander comprised of reflective optics (mirrors). FIG. 2 is a top-plan view of the beam expander 200, interferometer 102 and the transmission flat 109. For clarity, enclosure 112 is not shown. The interferometer 102 is configured to direct incident beam or rays 202 toward the secondary mirror 104 included in the beam expander 200. The incident beam 202 may be a coherent and collimated beam for example. Alternatively, the incident beam may be a diverging beam, for example. Additional adjustments may be required in the positioning of the reflective optics to account for a diverged incident beam. The incident beam may also have different wavelengths at different times, for example. The present setup is configured to operate in a narrow band of wavelengths centered at 632 nm. For example, a Helium-Neon (HeNe) laser may be used to emit an incident beam. The setup is configured to accommodate wavelengths from 400 nm-1064 nm, for example, without any additional changes in the configuration. The secondary mirror 104 receives the incident beam 202 and is configured to bring the beam to a focus as it reflects it towards the primary mirror. Prior to impinging on the primary mirror 106 the beam is focused and expanded to a size larger than it was at the secondary mirror 104. In this configuration the secondary mirror may be a concave mirror which may have an off-axis paraboloid shape. Alternatively, the secondary mirror 104 may be a convex off-axis paraboloidal mirror, for example. As such, the reflected beam 204 simply diverges or expands when it is reflected to the primary mirror 106. The primary mirror 106, also included in the beam expander 200, is configured to receive the diverging beam 204 from the secondary mirror 104. The primary mirror 106 may be a concave off-axis paraboloidal mirror that collimates the diverging beam into a collimated beam 206, for example. The collimated beam 206 is reflected toward the transmission flat 108. The beam width of the collimated beam 206 exiting the beam expander is substantially larger than the incident beam 202. Thus, the beam expander 200 through the reflecting mirrors expands an incident beam. The collimated beam 206 may exit the beam expander 200 along an axis (not shown) which is parallel to another axis (not shown) of the incident beam 202, for example. The primary and the secondary mirrors are aligned in a way such that the beam 206 impinging on the transmission flat 108 is collimated and the wavefront error of the beam 206 is minimized.

The test setup 100 further includes beam expander mount platform 116 on which the beam expander 200 resides. Details of an example platform 116 are provided below.

As discussed above, an interferometer setup may suffer from alignment drift primarily due to adjustable mounts that are thermally sensitive and tend to drift over time. To address such problems, the example interferometer setup 100 includes platform 116 which is thermally insensitive. As such, the beam expander 200 sitting on the platform 116 is not subject to misalignments with the interferometer 102 or with the transmission/reference flats 108/109 due to a temperature variation. The temperature variation may also arise from an atmospheric change in the test environment. For example, the room temperature where the experiment is carried out may vary throughout the day. To compensate for these variations, the materials used in the example platform 116 have a low coefficient of thermal expansion (CTE) enabling the test setup 100 to be completely functional in an environment with temperature variation. In one example, the material used for platform 116 may be Invar™/Carbon Fiber.

Figure 3:
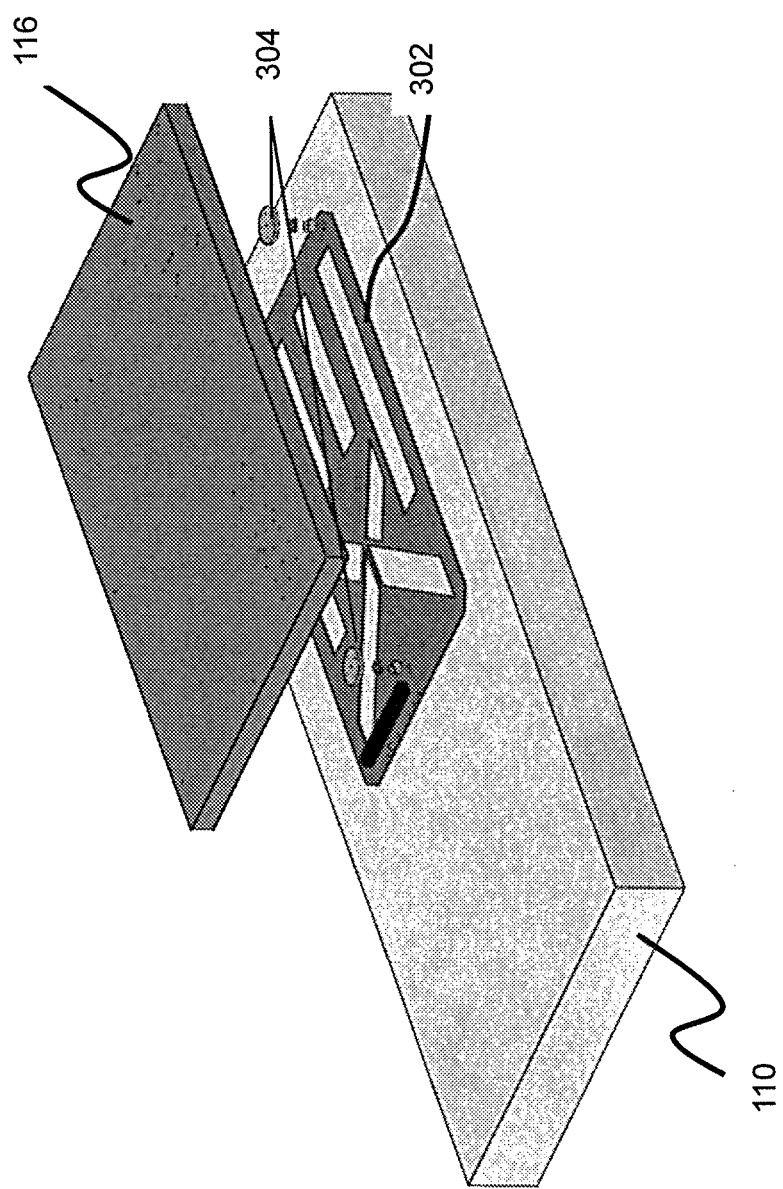
FIG. 3 is a perspective illustrating a beam expander mount platform sitting on a test bed in accordance with an embodiment of the present invention.

Moreover, the platform 116 may be further configured to interface with the test bed 110 kinematically via interface plate 302. This kinematic interface allows the two surfaces (110 and 116) to have different rates of expansion without inducing any strain into the beam expander mount platform. Strain may cause bending of the platform and therefore induce a misalignment within the beam expander. Thus this feature of the platform allows the beam expander to maintain its internal alignment as well as its alignment with the interferometer 102 and the transmission/reference flats 108. As shown in FIG. 3, the platform is mounted on the test bed 110 by three sets of large hardened Vee locators and receivers 304 (only two are shown). These are doweled to face a center point of the platform 116 In other words, it is contemplated that the virtual long axis of each vee connects to the center point of platform 116. Thus, due to this configuration any stress/strain that may be imparted on the optics due to material growth (e.g. thermal expansion) can be eliminated. Hence, the operation of the test setup 100 tends to be repeatable without any additional adjustments.

Figure 4:
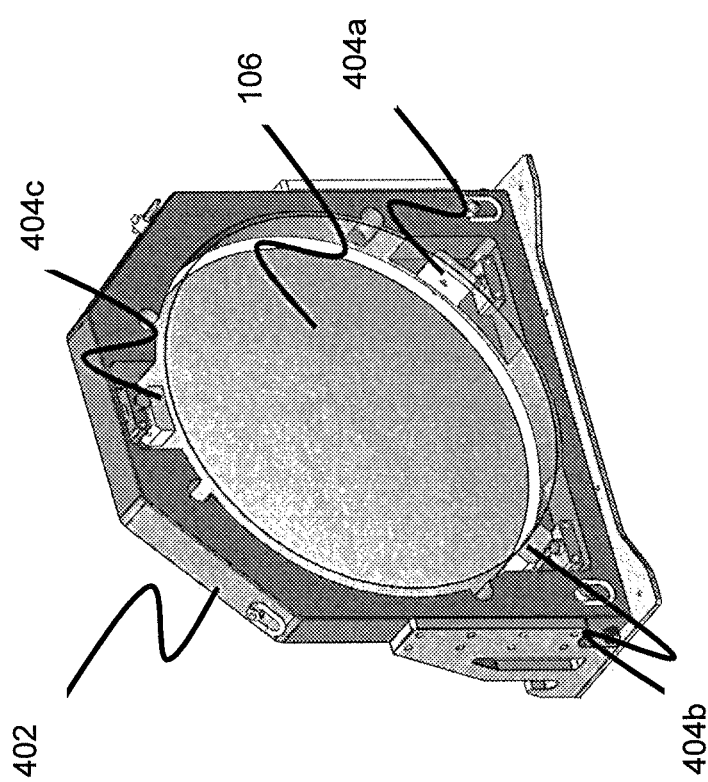
FIG. 4. is a perspective diagram showing a non-adjustable mount for mounting a primary mirror according to an embodiment of the present invention.

FIG. 4 is a schematic of the primary mirror 106 mounted in a non-adjustable mount 402. The non-adjustable mount 402 is a rigid fixture that keeps the primary mirror 106 in a fixed position and is configured to sit on the platform 116. The fixed positioning of the non-adjustable mount 402 reduces a potential drift in position of the primary mirror 106, thus minimizing the possibility of a misalignment. This may be advantageous compared to a primary mirror 106 being mounted on a flexible frame that may experience relatively larger drift in position. For example, vibrations of the test bed 110 may cause a shift in position of the primary mirror 106. However, the non-adjustable mount 402 ensures that the positioning of the primary mirror is minimally affected by the vibration. Thus, in the test setup 100, the primary mirror 106 mounted on the non-adjustable mount 402 may be used as a reference point for the alignment process.

Furthermore, the non-adjustable mount 402 may be used to mount the primary mirror 106 at the time of testing the mirror during the manufacturing process. The same non-adjustable mount 402 may be used in the setup of the beam expander 200. By doing so, for example, any effects of strain created in the mirror by the mount during the manufacturing process are the same as during the test setup 100. Thus, all the effects of the strain can be compensated during the final configuration of the mirror. Whereas, if different mounts were to be used for the same primary mirror, additional strain may be introduced to the mirror resulting in uncompensated strain.

A fixed mount, such as the non-adjustable mount 402, may also cut down the cost of the overall setup by eliminating expensive adjustable mounts and stages for the primary mirror 106.

Another feature of the primary mirror 106, as shown in FIG. 4, may be that it is bonded to mount pads 404a-c. Although three mount pads are shown, it is contemplated that fewer or more mount pads can be bonded to the primary mirror 106. The mount pads 404a-c interface between the primary mirror 106 and the mount 402 allowing the primary mirror 106 to be mounted in the non-adjustable mount 402, and also dismounted from mount 402, with ease in a repeatable fashion. Specifically, mount pads 404a-c ensure that additional strain is not introduced during the mounting and dismounting process.

The mounting pads 404 may be, for example, made from Invar™ (64FeNi) combined with silicone-rubber, for example, room temperature vulcanizing silicone (RTV) such as RTV 566. The advantage of using such composite materials for the mounting pads 404 is briefly explained as follows. Invar™ has a small CTE, results in substantially small dimensional changes in these composite materials. On the other hand, RTV 566 is physically soft. As such, upon combining together these two different materials, any minute dimensional change in the Invar™ can be absorbed, and thus compensated, by the soft RTV 566 material. Thus, mounting pads made out of the above mentioned composite can minimize thermal strain on the mirror.

Figure 5:
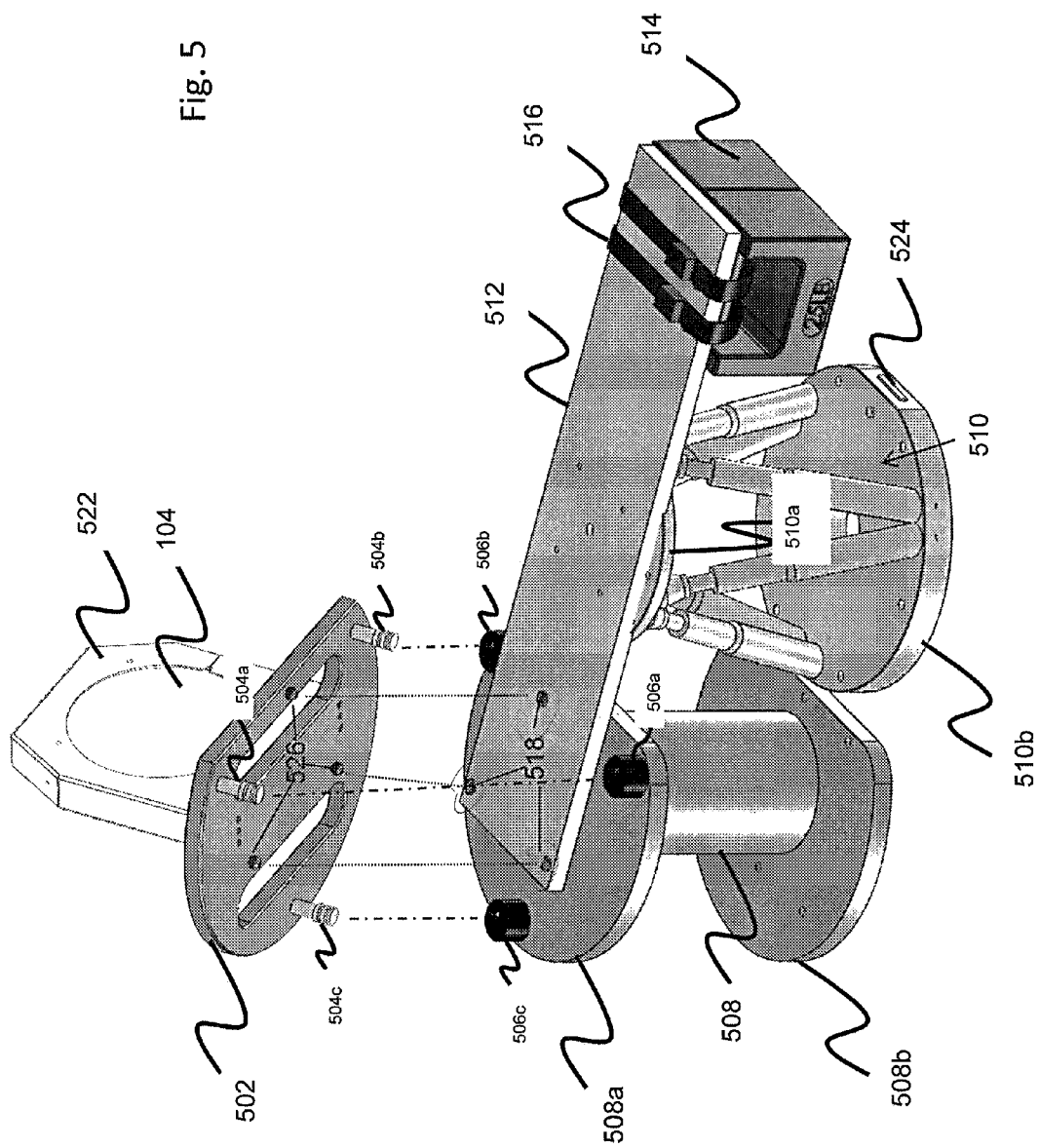
FIG. 5 is a perspective diagram depicting a setup of a secondary mirror with an auxiliary alignment device in accordance with an embodiment of the present invention.

FIG. 5 is a perspective drawing providing a detailed view of an assembly of the secondary mirror 104 consisting of a secondary mirror mount 522, a base plate 502, potting posts 504a-c and the secondary mirror 104. Secondary mirror 104 is mounted in the secondary mirror mount 522. Mount 522 is affixed to the base plate 502. The base plate 502 has multiple holes (not shown) through which the potting posts 504a-c can be attached.

During an alignment process of the reflective optics, the secondary mirror assembly is separated from the base mount 508 by an auxiliary alignment device 510. The example auxiliary alignment device 510 shown in FIG. 5 is a hexapod, but it could be any other alignment device that allows similar adjustments. A structural member (e.g. bar) 512 is configured to be fixed to the hexapod's top part 510a. Weights 514 are attached to the bar 512. The weights 514 act as a counterbalance as the hexapod can only handle a specific amount of weight in an off-axis position. Examples of weights shown in FIG. 5 is are two 12 Kg (25 lb) weights, but other weights may be used for counterbalancing. Bar 512 is configured to hold base plate 502 kinematically during alignment via cone (not shown), vee (not shown), flat mounts 518 and balls 526. The top part of the base mount includes potting cups 506a-c. Motion of the hexapod 510 may be controlled by a controller (not shown). The hexapod has multiple degrees of freedom of motion. As such, it may hover the secondary mirror 104 assembly over the base mount 508 and potting cups 506. The controller may be connected to the hexapod 510 via the connector 524. The hexapod's bottom part 510b and the base mount's bottom part 508b are configured to be attached to the platform 116. Details of the interaction of the potting posts 504a-c with the potting cups 506a-c are provided below.

As mentioned earlier, during an alignment process of the beam expander 200, the primary mirror 106 is used as the reference optical component. Thus, the secondary mirror 104 is aligned to the primary mirror 106 using the alignment assemblies as described in FIG. 5. The fine alignment of the mirrors is accomplished by measuring the wavefront of the beam expander. Using the large transmission flat 108 at the output of the system and a reference flat 109 (e.g. standard commercial off-the-shelf (COTS) flat) mounted to the front of the interferometer 102, an interference pattern is measured by the interferometer. The secondary mirror 104 is then adjusted until the wavefront error is reduced to an acceptable level.

At first, the primary mirror 106, mounted on the non-adjustable mount 402, is positioned at a desired location on the platform 116. Following that, the secondary mirror assembly is aligned with the primary mirror 106. The secondary mirror assembly then sits misaligned on the mounts 518 on bar 512. The bar 512 is positioned between the secondary mirror assembly and the base mount top 508a. In order to align the secondary mirror assembly to the primary mirror 106, the hexapod 510 is operated via a controller such that the motion of the hexapod stimulates a movement in the secondary mirror 104 via the bar 512. The motion of the hexapod 510 helps to adjust the position of the secondary mirror 106. Particularly, in the adjustment process the potting posts 504a-c can move around within the oversized potting cups 506a-c. Once the secondary mirror 104 is properly positioned, or aligned to the primary mirror 106, the potting cups are then filled with a bonding agent to lock the position of the secondary mirror 104. The hexapod 510, bar 512 and weights 514 may then be removed from the setup. Thus, by using a hexapod or other removable auxiliary alignment device 510, the cost of the overall setup can be kept low. Moreover, because the auxiliary alignment device 510 can be removed after the alignment, no further movement of the optical components is necessary during the test measurements. Thus, the secondary mirror 104 can be aligned to the primary mirror 106 during an alignment process using a removable auxiliary alignment device. The secondary mirror 104 may be aligned when the auxiliary alignment device 510 is at operating temperature.

Figure 6:
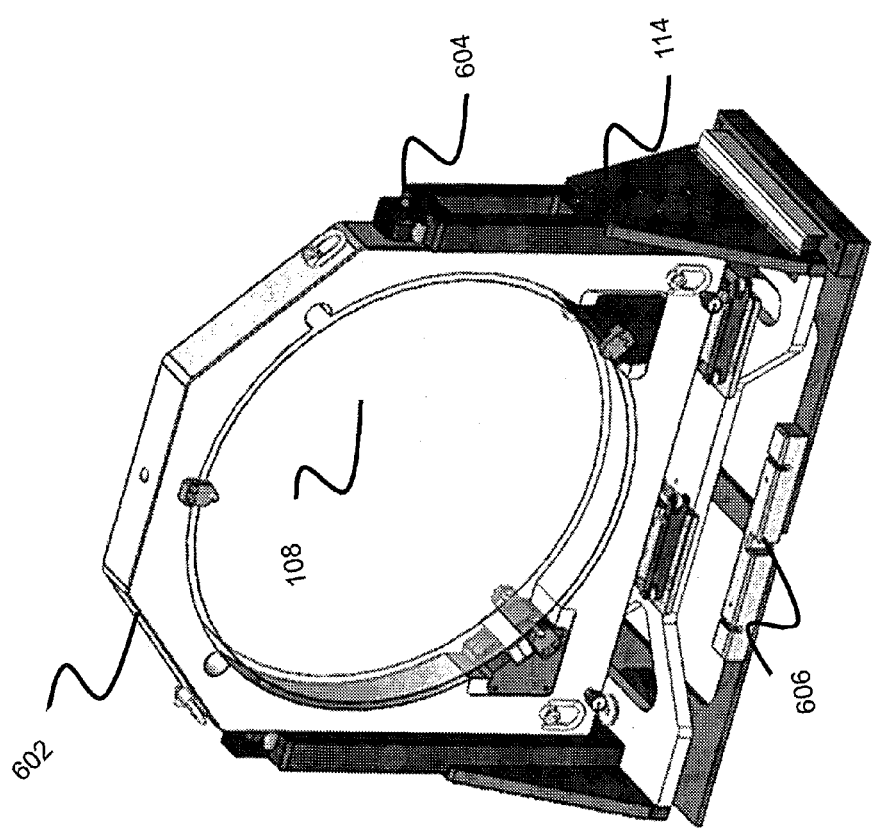
FIG. 6 is a perspective diagram of a transmission flat mounted on a tip/tilt stage according to an embodiment of the present invention.

FIG. 6 shows a transmission flat 108, or alternatively, a reference flat 109, mounted on the mount 602. The mount 602 is mounted on the tip/tilt stage 114. The tip/tilt stage 114 has a hinge 604 around which the mount 602 can tip or tilt. The hinge allows one axis of tilt whereas the other axis may be enabled by a pin in the bottom (not shown), for example. The stage 114 has a docking feature 606. The docking feature 606 is designed so that the stage can dock into the platform 116. By docking the flats 108 and 109 in this way, the positioning of the flats with respect to the beam expander is simplified and the test measurements are repeatable, avoiding any positional drift in the stages.

Although the present invention is illustrated and described herein with reference to specific embodiments, the invention is not intended to be limited to the details shown. Rather, various modifications may be made in the details within the scope and range of equivalents of the claims and without departing from the invention.

What is claimed is:
1. An apparatus comprising:
a secondary reflective optic;
a reflective optic mount in which the secondary reflective optic is mounted;
a base plate affixed to the reflective optic mount, wherein the base plate includes potting posts and alignment balls;
a base mount comprising a base mount top, a base mount bottom and potting cups, wherein the base mount top comprises the potting cups and the potting cups are configured to receive the base plate potting posts; and a bar located between the base plate and the base mount holding the reflective optic mount, wherein:

the alignment balls facilitate alignment of the secondary reflective optic with a primary reflective optic, the bar is configured to hold the base plate during alignment via the alignment balls; and the potting cups are further configured to receive a bonding agent that fixes the position of the base plate to the base mount and fixes the alignment of the secondary reflective optic with the primary reflective optic.

2. The apparatus of claim 1, further comprising:
a removably insertable auxiliary alignment device, and
wherein the bar is attached to the removably insertable auxiliary alignment device.

3. The apparatus of claim 2, wherein the removably insertable auxiliary alignment device includes a hexapod having multiple degrees of freedom of motion.

4. The apparatus of claim 2, wherein the bar includes a flat mount or a vee configured to accept the base plate alignment balls to kinematically assemble the optical piece.

5. The apparatus of claim 2, further comprising:
a weight attached to the bar for counterbalancing when the removably insertable auxiliary alignment device is supporting an off balanced load.

6. The apparatus of claim 1, wherein the reflective optic mount is a non-adjustable mount.

7. The apparatus of claim 6, wherein the reflective optic mount comprises:
a plurality of mounting pads, wherein each of the plurality of mounting pads is made of a first material with low coefficient of thermal expansion (CTE), and a second material being physically soft such that a dimensional expansion of the first material is absorbed by the second material.

8. The apparatus of claim 7, wherein the first material is 64FeNi and the second material is silicone rubber.

9. The apparatus of claim 1, further comprising:
a thermally insensitive platform, wherein the base mount is a rigid fixture and is fixed to the thermally insensitive platform.

10. The apparatus of claim 9, further comprising:
an interferometer, wherein the interferometer is coupled to the thermally insensitive platform at a position in which an incident light beam from the interferometer follows an optical path to the secondary reflective optic, next to the primary reflective optic, and toward a position configured to hold an optical test piece.

11. The apparatus of claim 1, wherein the thermally insensitive platform is made of 64FeNi or a carbon fiber having a low coefficient of thermal expansion.

12. The apparatus of claim 1, wherein the primary and the secondary reflective optics are off-axis paraboloidal mirrors.

13. The apparatus of claim 1, wherein the secondary reflective optic is configured to receive an incident beam having wavelengths in the range of 400 nm-1064 nm.

14. A method for aligning a test device for an optical piece including the steps of:

fixing a primary reflective optic to a predetermined position on a thermally insensitive platform via a non-adjustable mount;

maintaining a baseplate of a secondary reflective optic on an alignment bar, wherein:

the alignment bar is positioned between the secondary reflective optic baseplate and a top surface of a secondary reflective optic base mount, the secondary reflective optic baseplate includes a plurality of potting posts, and the top surface of the secondary reflective optic base mount includes a plurality of potting cups for receiving respective potting posts of the plurality of potting posts;

adjusting a position of the secondary reflective optic with reference to the predetermined position of the primary reflective optic by a removably insertable auxiliary device, wherein the respective potting posts of the plurality of potting posts are movable within respective potting cups of the plurality of potting cups;

inserting a bonding agent into the potting cups of the secondary reflective optic based mount to fix the position of the secondary reflective optic relative to the primary reflective optic;

removing the alignment bar from the baseplate of the secondary reflective optic to provide an aligned test device.

15. The method of claim 14, wherein the step of inserting the bonding agent locks of the respective potting posts in the respective potting cups to fix the position of the secondary reflective optic relative to the primary reflective optic.

\* \* \* \* \*